United States Patent Office 3,505,296
Patented Apr. 7, 1970

3,505,296
FIBRE-FORMING POLYAMIDES OF IMPROVED AFFINITY FOR ACID DYES
Harold George Burrows and Stephen John Hepworth, Blackley, Manchester, England, assignors to Imperial Chemical Industries Limited, London, England, a corporation of Great Britain
No Drawing. Filed Feb. 16, 1967, Ser. No. 616,459
Claims priority, application Great Britain, Feb. 22, 1966, 3,074/66; Mar. 24, 1966, 7,719/66
Int. Cl. C08g 41/02
U.S. Cl. 260—78                       2 Claims

ABSTRACT OF THE DISCLOSURE

Polyamides of improved affinity for acid dyestuffs which are obtained by polymerising a lactam or a mixture of a diamine and a dicarboxylic acid in the presence of a salt of an aliphatic diamine with an inorganic oxy-acid of phosphorus.

---

The invention relates to fibre-forming melt spinnable polyamides, having improved properties, and to a process for the manufacture of the said polyamides.

According to the invention there are provided fibre-forming polyamides which are obtained by polymerising a lactam having a ring of from 7 to 13 atoms or the corresponding aminoacid thereof, or substantially equimolar proportions of a diamine which contains at least two carbon atoms between the amino groups and a dicarboxylic acid which contains at least two carbon atoms between the carboxylic acid groups, in the presence of from 0.1 to 5.0 molar percent, based on the molecular weight of the recurring units of the polyamide chain, of a salt of an aliphatic diamine with a strong inorganinc oxy-acid of phosphorus.

The process of the invention can be carried out under the conditions normally employed for polymerising a lactam having a ring of from 7 to 13 atoms of the corresponding aminoacid, or for polymerising a mixture of a lactam, a diamine and a dicarboxylic acid, or for polymerising a mixture of a lactam, a diamine and dicarboxylic acid, the aliphatic diamine salt of the said inorganic oxy-acid of phosphorus being added at any stage of the polymerisation process. It is however preferred to add the said salt during the initial stages of the polymerisation and, above all, at the stage of charging the reactants to the polymerisation vessel. If desired the polymerisation can be carried out in the presence of a delustrant, such as titanium dioxide, and/or molecular weight regulators.

When starting from an equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylenediamine.

The process of the invention is preferably carried out at a temperature between 200° and 400° C., until the required degree of polymerisation is obtained.

The strong inorganic oxy-acids of phosphorus which are used in the form of their salts with aliphatic diamines are any inorganic oxy-acids of phosphorus which have a pK value of less than 3.5. As specific examples of the said acids there may be mentioned orthophosphoric acid, metaphosphoric acid, pyrophosphoric acid, phosphorous acid and hyophosphorous acid.

The aliphatic diamines which are used in the form of salts with the said acids are preferably alkylene diamines containing at least two, preferably not more than 18 carbon atoms between the amino groups, such as trimethylenediamine, tetramethylenediamine, pentamethylenediamine, octamethylenediamine, decamethylenediamine, dodecamethylenediamine, and above all hexamethylenediamine. When the polyamide is being obtained by polymerisation of substantially equimolecular proportions of a diamine and a dicarboxylic acid, or a salt thereof, then it is preferred that the aliphatic diamine which is in the said salt with the acid is the same as the diamine which is being polymerised with the dicarboxylic acid. Thus, for example, when a mixture of substantially equivalent amounts of hexamethylenediamine and adipic acid is being polymerised then it is preferred to use a salt of the acid and hexamethylenediamine.

The said salt can be a salt of one or more molecular proportions of the inorganic oxy-acid of phosphorus with one molecular proportion of the diamine. The said salt can be added as such to the polymerisation mixture, or alternatively there can be added the requisite amounts of the acid and of the aliphatic diamine in which case the salt is formed in situ. If desired there can be used an excess of the aliphatic diamine over the quantity required to form a salt with the acid.

The amount of the aliphatic diamine salt of the inorganic oxy-acid which is added to the polymerisation mixture is preferably between 0.1 and 3.0 molar percent based on the molecular weight of the recurring units of the polyamide chain.

As examples of the said polymerisable lactams, or the corresponding aminoacids, there may be mentioned ε-aminocaproic acid, caprolactam, 9-aminononanoic acid, 11-aminoundecanoic acid, 17-aminoheptadecanoic acid, dodecanolactam and enantholactam.

As examples of the said diamines there may be mentioned diamines of the general formula $H_2N(CH_2)_mNH_2$ wherein $m$ is an integer of from 2 to 12, such as trimethylene diamine, tetramethylenediamine, pentamethylenediamine, octamethylenediamine, dodecamethylenediamine, and above all hexamethylenediamine.

As examples of the said dicarboxylic acids there may be mentioned terephthalic acid and isophthalic acid, but preferably the dicarboxylic acids of the formula

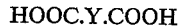

HOOC.Y.COOH wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

The polyamides produced by the process of the invention can be converted into fibres by any of the conventional methods of producing fibres from polymers, for example by melt spinning.

It is found that the polyamides obtained by the process of the invention have a higher molecular weight than would otherwise be obtained by carrying out the polymerisation in the absence of said salts; and this is of particular importance since, although polymers of similar high molecular weight are known, these have previously been obtained by methods which are liable to result in increased degradation of the polymers or which require the use of specialised equipment.

A preferred class of polyamides obtained by the process of the invention comprises those polyamides which are obtained by adding to the polymerisation mixture from 0.1 to 3.0 molar percent, based on the molecular weight of the recurring units of the polyamide chain, of a salt comprising one molecular proportion of an aliphatic diamine and one molecular proportion of the acid, or the corresponding amounts of the aliphatic diamine and the acid. Fibres prepared from the preferred class of polyamides have excellent affinity for acid dyestuffs, even when the dyestuffs are applied from alkaline dyebaths, and their affinity for the dyestuffs is much greater than that of fibres prepared from the corresponding polymers which were prepared in the absence of the said salt.

The said inorganic oxy-acid of phosphorus does not form an integral part of the polymer chain which consists of recurring —NHCO— groups separated from each other by a chain of at least two carbon atoms, and although its presence, in the form of a salt with the aliphatic diamine, does not have a deleterious effect on the resulting polymer, it is readily removed by subsequent washing of the polymer or during subsequent treatment of the fibres in an aqueous bath, for example during dyeing of the fibres. Surprisingly it is found that the dye uptake of fibres prepared from the polymers of the invention is not reduced if the acid is removed by washing prior to dyeing the fibres. Since fibres prepared from the preferred polymers of the invention have improved affinity for acid dyestuffs it is usually unnecessary to introduce into the polymers other agents, such as N:N-bis-(3-aminopropyl)-piperazine, which are known to improve dye uptake, but if desired, such agents can be introduced at the polymerisation stage.

The invention is illustrated, but not limited by the following examples in which the parts and percentages are by weight. The term "relative viscosity" is defined as the ratio of the dynamic viscosity of an 8.4% solution of the polyamide in 90% formic acid to the dynamic viscosity of 90% formic acid, both viscosities being determined at 25° C.

EXAMPLE 1

5,420 parts of hexamethylene diammonium adipate, 45.2 parts of orthophosphoric acid, 53.5 parts of hexamethylenediamine and 2,500 parts of water are charged to a stainless steel autoclave, which is then heated to 100° C. The autoclave is purged with steam, then closed, and heating is continued until a pressure of 250 pounds per sq. in. (p.s.i.) and a temperature of 210° C. is obtained. Heating is then continued until a temperature of 235° C. is obtained whilst the pressure is maintained at 250 p.s.i. by a slow release of steam from the autoclave. The pressure in the autoclave is then slowly reduced to atmospheric pressure while the temperature is raised to 273° C. After 10 minutes at this temperature the polymer is discharged from the autoclave and converted by melt-spinning into fibres.

These fibres have a much higher affinity for the acid dyestuff, Solway Blue BN (C.I. Acid Blue 45), than fibres obtained from a polymer which was prepared as described above except that the phosphoric acid and hexamethylenediamine (HMD) were omitted from the autoclave, as shown by the following table which gives the dye uptake of Solway Blue BN on the two types of fibre at varying dyebath pH's.

|  | pH of dyebath | Percent dye uptake |
|---|---|---|
| Fibre from polymer prepared in the presence of the orthophosphoric acid and HMD. | 4.0<br>7.0<br>9.0 | 7.20<br>4.51<br>1.43 |
| Fibre from polymer prepared in the absence of the orthophosphoric acid and HMD. | 4.0<br>7.0<br>9.0 | 1.50<br>0.40<br>0.00 |

EXAMPLE 2

100 parts of hexamethylene diammonium adipate, 0.86 part of hypophosphorus acid, 1.51 parts of hexamethylenediamine and 20 parts of water are charged into an autoclave, which is then purged with nitrogen. The autoclave is heated until a pressure of 250 p.s.i. and a temperature of 220° C. are attained. This pressure is maintained while the temperature is raised to 242° C. during 60 minutes. The pressure in the autoclave is reduced to atmospheric pressure, the temperature is raised to 275° C. during 60 minutes, and is maintained at 275° C. for a further 20 minutes. The autoclave is then cooled, opened, and the resulting polyamide removed from the autoclave and converted into chips.

The polyamide so obtained has a higher molecular weight than a polyamide prepared as described above except that the hypophosphorous acid and hexamethylenediamine were omitted from the autoclave as shown by the higher relative viscosity of 51.6 as against 42.2.

Fibres prepared from the polyamide chip of this example have a much higher uptake for acid dyestuffs, at various dyebath pH's, then fibres which were obtained from the polyamide obtained as described above except that the hypophosphorous acid and hexamethylenediamine were omitted from the autoclave.

EXAMPLE 3

In place of the 45.2 parts of phosphoric acid and 53.5 parts of hexamethylenediamine used in Example 1 there are used 1.96 parts of orthophosphoric acid and 23.0 parts of hexamethylenediamine whereby a polyamide of relative viscosity of 58.8 is obtained, compared with a polyamide of relative viscosity of 38.6 which is obtained when the phosphoric acid and hexamethylenediamine are omitted from the autoclave.

Fibres prepared from the polyamide of relative viscosity of 58.8 have a much higher affinity for acid dyestuffs than fibres similarly prepared from the polyamide of relative viscosity of 38.6.

EXAMPLE 4

A polyamide is prepared as described in Example 1 except that 113 parts of caprolactam are also charged to the autoclave. The resulting copolyamide has a relative viscosity of 46.2 compared with 34.6 for the corresponding copolyamide prepared in the absence of the orthophosphoric acid and hexamethylenediamine.

Fibres prepared from the copolyamide of relative viscosity 46.2 have a much higher affinity for acid dyestuffs than fibres prepared from the copolyamide of relative viscosity 34.6.

EXAMPLE 5

In place of the 45.2 parts of orthophosphoric acid and 53.5 parts of hexamethylenediamine used in Example 1 there are used 42.8 parts of hexamethylene diammonium orthophosphate whereby a polyamide of relative viscosity of 53.6 is obtained which has excellent affinity for acid dyestuffs.

EXAMPLE 6

In place of the 0.86 part of hypophosphorous acid and 1.51 parts of hexamethylenediamine used in Example 2 there are used the quantities of the acids and of the hexamethylenediamine listed in the following table whereby polyamides are obtained which have the relative viscosities listed in the corresponding line in the third column of the table.

| Acid and the quantity used | Amount of hexamethylenediamine used (part) | Relative viscosity of the polyamide |
|---|---|---|
| 1.5 parts of orthophosphoric acid | 0.88 | 40.2 |
| 0.31 part of phosphorous acid | 0.44 | 60.3 |
| 0.125 part of hypophosphorous acid | 0.22 | 62.1 |
| 0.86 part of hypophosphorous acid | 2.5 | 58.9 |

Fibres prepared from the polyamides of this example have a much higher affinity for acid dyestuffs than fibres prepared from the corresponding polyamides which were prepared in the absence of the said oxy-acids of phosphorus and the aliphatic diamine.

EXAMPLE 7

30 parts of hexamethylene diammonium adipate, 0.046 part of metaphosphoric acid and 0.2 part of decamethylenediamine are heated for 4 hours at 220° C. in a sealed container under an atmosphere of nitrogen. The pressure in the container is then reduced to atmospheric, after which the container is heated for 45 minutes at 295° C. The resulting polyamide is then removed from the container and converted into polymer chips.

The relative viscosity of the polymer is 53.0 which is much higher than that of a polymer prepared by polymerising hexamethylene diammonium adipate on its own under the same conditions.

When the polymer of this example is melt spun fibres of satisfactory physical properties are obtained which have excellent affinity for acid dyestuffs even when applied from an aqueous dyebath of pH 8.

EXAMPLE 8

In place of the metaphosphoric acid and decamethylenediamine used in Example 7 there are used 0.052 part of pyrophosphoric acid and 0.33 part of dodecamethylenediamine whereby a polyamide of relative viscosity of 54.1 is obtained.

Fibres of this polyamide have excellent affinity for acid dyestuffs.

We claim:

1. Fibre-forming polyamides of improved affinity for acid dyes consisting essentially of polyamides which are obtained by heating at a temperature of 200 to 400° C. under superatmospheric pressure a mixture of
   (1) a polyamide forming reactant selected from the class consisting of
      (a) lactams having a ring of from 7 to 13 atoms or the corresponding aminoacids thereof,
      (b) substantially equimolecular proportions of a diamine which contains at least two carbon atoms between the amino groups and a dicarboxylic acid which contains at least two carbon atoms between the carboxylic acid groups, and
      (c) mixtures of (a) and (b) in the presence of
   (2) from 0.1 to 5.0 molar percent of a salt of an alkylene diamine having 2 to 18 carbon atoms between amine groups with a strong inorganic oxy-acid of phosphorus.

2. Polyamides, as claimed in claim 1, which are obtained by polymerising hexamethylene diammonium adipate in the presence of 0.1 to 5.0 molar percent, based on the molecular weight of the recurring units of the polyamide chain, of a salt of hexamethylenediamine with a strong inorganic oxy-acid of phosphorus.

References Cited

UNITED STATES PATENTS

| | | | |
|---|---|---|---|
| 2,244,192 | 6/1941 | Flory | 260—78 |
| 2,510,777 | 6/1950 | Gray | 260—78 |
| 2,557,808 | 6/1951 | Walker | 260—78 |
| 2,564,001 | 8/1951 | Genas | 260—78 |
| 2,705,227 | 3/1955 | Stamatoff | 260—78 |
| 3,027,356 | 3/1962 | Von Schick et al. | 260—78 |
| 3,173,898 | 3/1965 | Sum | 260—78 |
| 3,235,534 | 2/1966 | Brinkman et al. | 260—78 |
| 3,296,215 | 1/1967 | Crovatt | 260—78 |
| 3,296,216 | 1/1967 | Snooks | 260—78 |
| 3,300,448 | 1/1967 | Gauthier | 260—78 |
| 3,344,107 | 9/1967 | Miller | 260—78 |
| 3,365,427 | 1/1968 | Ballentine et al. | 260—78 |
| 3,365,428 | 1/1968 | Wujciak | 260—78 |

HAROLD D. ANDERSON, Primary Examiner

U.S. Cl. X.R.

8—55; 260—45.9